United States Patent
Kuriyama et al.

(10) Patent No.: US 7,583,299 B2
(45) Date of Patent: Sep. 1, 2009

(54) MOVING IMAGE RECORDING APPARATUS WITH A STREAM RECORDING FUNCTION OF A MOVING IMAGE

(75) Inventors: Yuji Kuriyama, Ome (JP); Toshiya Kiso, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 660 days.

(21) Appl. No.: 11/033,423

(22) Filed: Jan. 11, 2005

(65) Prior Publication Data

US 2005/0151859 A1   Jul. 14, 2005

(30) Foreign Application Priority Data

Jan. 14, 2004 (JP) ............... 2004-006362
Mar. 3, 2004 (JP) ............... 2004-058297

(51) Int. Cl.
H04N 5/76 (2006.01)
(52) U.S. Cl. ............... 348/231.99
(58) Field of Classification Search ........... 348/231.99, 348/231.6, 231.7, 213.9; 386/21, 113
See application file for complete search history.

(56) References Cited

U.S. PATENT DOCUMENTS

| | | | |
|---|---|---|---|
| 5,546,461 A * | 8/1996 | Ibaraki et al. ............... 380/217 |
| 5,600,661 A * | 2/1997 | Shimokoriyama ........... 714/704 |
| 6,219,321 B1 * | 4/2001 | Serizawa et al. ......... 369/47.33 |
| 6,266,372 B1 * | 7/2001 | Niida et al. ............ 375/240.16 |
| 6,449,426 B1 | 9/2002 | Suga et al. |
| 6,590,609 B1 | 7/2003 | Kitade et al. |
| 6,625,655 B2 * | 9/2003 | Goldhor et al. ............. 709/231 |
| 6,680,748 B1 * | 1/2004 | Monti ...................... 348/220.1 |
| 6,788,879 B1 * | 9/2004 | Nozawa ....................... 386/89 |
| 2001/0052886 A1 * | 12/2001 | Ikeda ........................... 345/87 |

(Continued)

FOREIGN PATENT DOCUMENTS

JP     9-214881 A     8/1997

(Continued)

OTHER PUBLICATIONS

Japanese Office Action (and English translation) dated May 20, 2008, issued in a counterpart Japanese Application.

(Continued)

*Primary Examiner*—Tuan V Ho
*Assistant Examiner*—Kent Wang
(74) *Attorney, Agent, or Firm*—Frishauf, Holtz, Goodman & Chick, P.C.

(57) ABSTRACT

Plural pieces of frame data compose a moving image. When a data writing process of writing previous frame data is in progress at the time when the latest frame data is written at a certain frame period while the plural pieces of frame data are being successively written on a recording medium, it is determined that a delay has occurred in the writing process of writing the frame data on the recording medium. When it is determined that a delay has occurred in the writing process, alternative frame data is written on the recording medium in place of the latest frame data, whereby a data amount to be recorded is reduced. When it is determined that no delay has occurred, the latest frame data is written on the recording medium.

7 Claims, 13 Drawing Sheets

U.S. PATENT DOCUMENTS

| | | | |
|---|---|---|---|
| 2002/0018054 A1* | 2/2002 | Tojima et al. | 345/204 |
| 2003/0098929 A1* | 5/2003 | Nono | 348/731 |
| 2004/0012686 A1* | 1/2004 | Ono et al. | 348/211.99 |
| 2004/0105019 A1* | 6/2004 | Imanishi et al. | 348/231.99 |

FOREIGN PATENT DOCUMENTS

| | | |
|---|---|---|
| JP | 9-322106 A | 12/1997 |
| JP | 10-042295 A | 2/1998 |
| JP | 10-136238 A | 5/1998 |
| JP | 10-233986 A | 9/1998 |
| JP | 2000-138941 A | 5/2000 |
| JP | 2000-217068 A | 8/2000 |
| JP | 2000-232619 A | 8/2000 |
| JP | 2001-169227 A | 6/2001 |
| JP | 2001-352510 A | 12/2001 |
| JP | 2002-247509 A | 8/2002 |
| JP | 2002-271745 A | 9/2002 |
| JP | 2003-179860 A | 6/2003 |
| JP | 2004-227676 A | 8/2004 |

OTHER PUBLICATIONS

Japanese Office Action (and English translation thereof) dated Sep. 30, 2008, issued in a counterpart Japanese Application.

Japanese Office Action dated Dec. 16, 2008, issued in counterpart application JP 2004-058297 and English translation thereof.

* cited by examiner

FIG. 2

| RECORDED IMAGE QUALITY | IMAGE SIZE | FRAME RATE | COMPRESSION RATE | DATA RATE |
|---|---|---|---|---|
| FINE | 640 × 480 | 30fps | 1/4 | 512KB/S |
| NORMAL | 640 × 480 | 30fps | 1/8 | 256KB/S |
| ECONOMY | 320 × 240 | 15fps | 1/8 | 64KB/S |

MOVING IMAGE RECORDING APPARATUS WITH A STREAM RECORDING FUNCTION OF A MOVING IMAGE

BACKGROUND OF THE INVENTION

1. Field of the Invention

The present invention relates to a moving image recording apparatus with a stream recording function of a moving image, an electronic camera and a moving image recording method.

2. Description of the Prior Art

In recent, moving-image recording apparatuses are available in the market, in which an input moving image is compressed in real time and a stream recording is executed to record image data on a recording medium. For instance, digital cameras having a moving-image recording function are examples of such moving-image recording apparatus. In general, various sorts of detachable memory cards are used as the recording medium in the digital camera. In a moving-image recording operation, image data is compressed every frame and successively recorded on the memory card and the like. Further, it is general that a user of such digital camera is allowed to select a quality (recorded image quality, "fine", "normal" and "economy") of the moving image to be recorded. A recording operation of a moving image in a shooting mode is executed in accordance with plural parameters (mainly, a compression system, compression rate, image size, and frame rate), and these parameters are fixed based on the selected recorded-image quality. Further, data volume to be processed within a certain period of time in the recording operation is almost determined based on the recorded-image quality.

Meanwhile, when the stream recording of a moving image is executed in the digital camera, the following method is employed to perform a long time recording, that is, in such method, a buffer area for recording image data for plural frames is secured in a built-in memory, and previously recorded image data is read out and recorded on the memory card and the frame data is removed from the built-in memory while frame data is being recorded on the built-in memory. In other words, the method uses the built-in memory as a ring buffer.

Further, in the image-recording operation, data volume to be processed within a certain fixed period of time increases as the recorded-image quality is set higher. When a data-writing rate per a unit time exceeds the data-writable rate of the memory card, this can be the cause of loss of the moving image data and/or discontinuity of a sound. The data-writing rate at which data is written on the memory card and the like greatly varies depending on the sort of the memory card. Therefore, the image-recording parameters corresponding to the recorded-image quality are fixed based on the sort of the memory card to be used.

SUMMARY OF THE INVENTION

According one aspect of the invention, there is provided a moving-image recording apparatus for recording image data on a recording medium, the image data composing a moving image, the apparatus which comprises a recording unit for processing the image data every certain frame period to successively write the processed image data onto the recording medium, a judging unit for judging whether or not any delay occurs to disturb a normal recording operation of the moving image while the recoding unit writes the processed image data onto the recording medium, and an adjusting unit for reducing data amount to be written on the recording medium when the judging unit determines that the delay has occurred.

Further, according to a second aspect of the invention, there is a moving image recording method of processing image data every certain frame period to successively write the processed image data onto a recording medium, the image data composing a moving image, which method comprises a step of judging whether or not any delay occurs to disturb a normal recording operation of the moving image while the processed image data is being written onto the recording medium, and a step of reducing data amount to be written on the recording medium when it is determined that the delay has occurred.

Furthermore, according to a third aspect of the invention, there is provided an electronic camera apparatus comprises an image pick-up unit for obtaining image data composing a moving image, a recording unit for compressing the image data obtained by the image pick-up unit every predetermined frame period, and for executing a data-writing process for successively writing the processed image data onto a detachable recording medium, a judging unit for judging whether or not any delay occurs to disturb a normal recording operation of the moving image during the data-writing process for writing the processed image data onto the recording medium, a stopping unit for making the recording unit cease the data-writing process for writing processed image data of the following frame onto the recording medium, when the judging unit determines that the delay has occurred in the data-writing process, and an adjusting unit for making the recording unit record on the recording medium certain information for reproducing the substantially same image as image data of the directly previous frame, in place of the image of the image data, the data-writing process of which the stopping unit ceases.

According to a fourth aspect of the invention, there is provided an electronic camera apparatus which comprises an image pick-up unit for obtaining image data every certain frame period, the image data composing a moving image, a recording unit for performing a data-writing process to successively write the image data obtained by the image pick-up unit onto a detachable recording medium, a rate obtaining unit for obtaining information concerning a data-writing rate at which the recording unit writes the image data onto the recording medium, and an adjusting unit for adjusting, based on the data-writing rate obtained by the rate obtaining unit, values of image recording parameters for determining image data volume to be written onto the recording medium within a fixed period of time to restrict the image data volume to a level less than data volume which can be written on the recording medium within the fixed period of time.

Further, according to a fifth aspect of the invention, there is provided a moving image recording method in an electronic camera apparatus having a moving image shooting function, in which image data is obtained every predetermined frame period by an image pick-up unit and is successively recorded on a detachable recording medium, the image data composing a moving image, which method comprises a step of obtaining information concerning a data-writing rate at which the image data is written onto the recording medium, and a step of adjusting, based on the obtained information of the data-writing rate, values of image recording parameters for determining image data volume to be written onto the recording medium within a fixed period of time to restrict the image data volume to a level less than data volume which can be written on the recording medium within the fixed period of time.

BRIEF DESCRIPTION OF THE DRAWINGS

FIG. 2 is a table showing relationship between image qualities and set up values of image recording parameters in a first embodiment.

DETAILED DESCRIPTION OF PREFERRED EMBODIMENTS

Now, an embodiment of the present invention will be described with reference to the accompanying drawings.

First Embodiment

Figure 1:
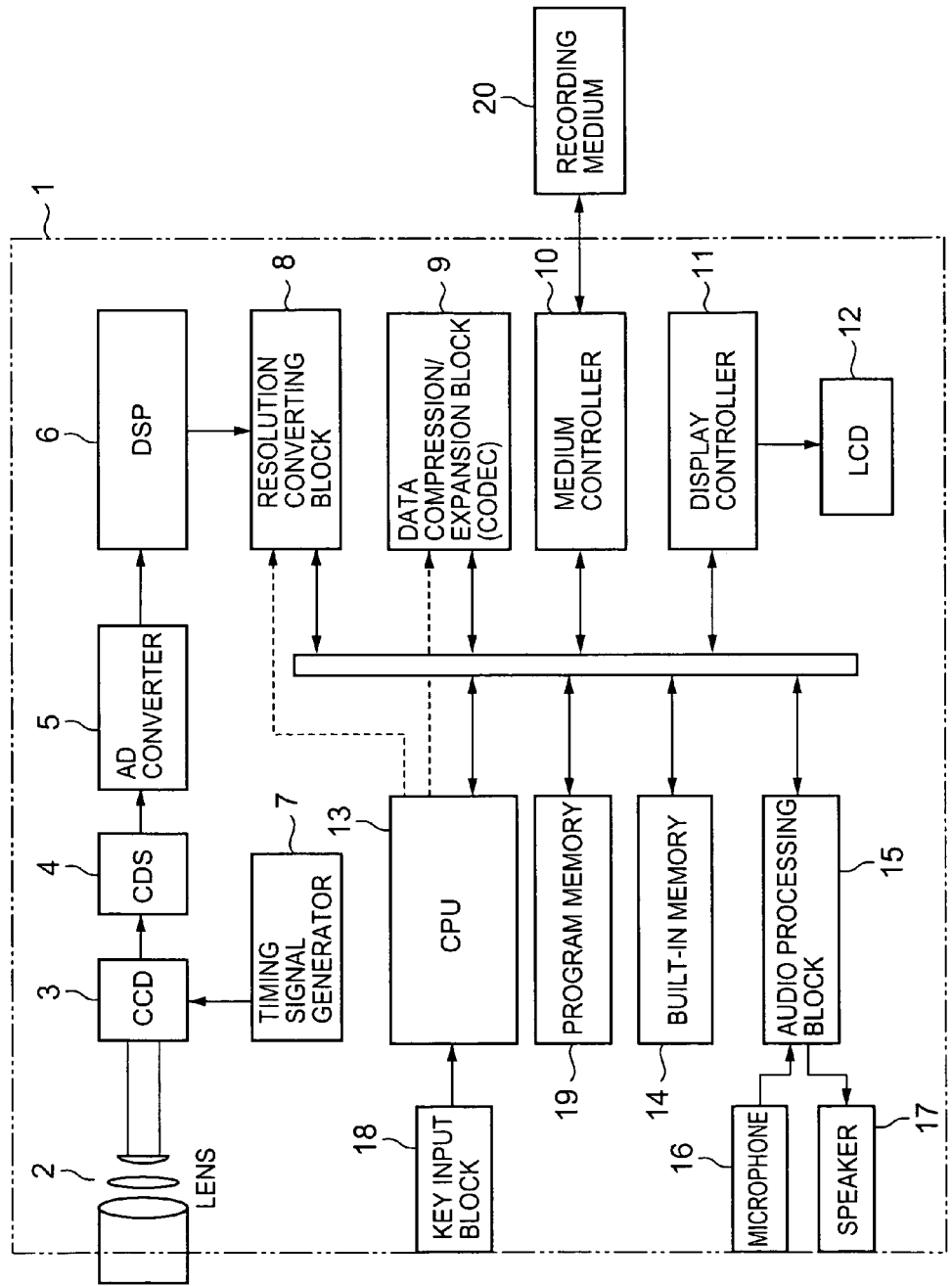
FIG. 1 is a block diagram showing a configuration of a digital camera which is used in each embodiment of the present invention.

FIG. 1 is a block diagram of a digital camera employed in each embodiment of the present invention. This digital camera has a moving image shooting function and is configured as will be described below.

The digital camera comprises a camera body 1 and a recording medium 20 which is detachably received in the camera body 1. The camera body 1 is provided with an optical system 2 including plural lenses and CCD 3 with a color filter (such as Bayer array color filter) installed. CCD 3 is an image pick-up unit, on a light receiving surface of which an optical image of an object is focused through the optical system 3. CCD 3 is driven by a driving signal supplied from a timing signal generator 7 to optically convert the optical image of the object into an image pick-up signal, and outputs the image pick-up signal. The output signal from CCD3 is sent to CDS circuit 4 to be subjected to a correlation double sampling and a gain adjustment, and further sent to AD converter 5 to be converted into a digital signal. AD converted Bayer data is input to DSP section 6, where the data is subjected to a process such as a pedestal clamping process, and then converted into a luminance signal (Y) and a chrominance signal (UV) in a luminance/chrominance matrix circuit in a block. Note that DSP section 6 also effects processes for enhancing a picture quality, such as an auto-iris, an auto white-balance, an outline emphasis and a pixel compensation process.

YUV data converted in DSP section 6 is sent to a resolution converting block 8, where a size of the data is converted into a predetermined image size, and then data for one frame is successively stored in a built-in memory 14 (for example, SDRAM). YUV data for one frame stored in the built-in memory 14 is sent to a display controller 11 to be converted into a video signal, and the video signal is displayed on LCD (liquid crystal display unit) 12 as a through image. The LCD 12 also serves as alarm means and second notice means when a moving image is recorded, as will be describe below.

YUV data which is stored in the built-in memory 14 during a moving-image shooting operation is successively sent to a data compression/expansion block 9 to be compressed and coded based on a codec of a predetermined moving image recording standard (for example, Motion-JPEG and PMEG) and then is temporarily stored in the built-in memory 14. The coded data is successively written as frame data onto a recording medium 20 through a medium controller 10. These series of operations are repeatedly executed for each frame data, and in this manner the compressed data stored in the built-in memory 14 is successively re-written. In other words, the compressed data is stored in a streaming manner (stream-record). The frame rate at which a moving image is shot is determined based on a timing signal generated by the timing signal generator 7, and a compression rate at which data is coded is decided based on a quantization-table value in the data compression/expansion block 9. A memory capacity of the built-in memory 14 contains a volume (volume including variations) equivalent to the compressed image data for one frame in the first embodiment. The built-in memory 14 serves as a buffer in a second, third and forth embodiment for holding frame data (compressed data) for plural frames to be written on the recording medium 20 later, and therefore a memory capacity is secured in the built-in memory 14 for that purpose. YUV data for one frame which are stored in the built-in memory 14 when a still image is photographed is compressed and coded based on JPEG standard in the data compression/expansion block 9, and then is made to file data in the built-in memory 14. The file data is recorded on the recording medium 20 as still image data through the medium controller 10. The data compression/expansion block 9 expands still data and moving image data read out from the recording medium 20 and develops or stores them in the built-in memory 14 when a still image or a moving image is reproduced.

An audio signal processing block 15 converts a voice entered through a microphone 16 built in the camera body 1 into a digital signal and compresses and sends the digital signal as audio data to the built-in memory 14. The audio data sent to the built-in memory 14 is successively written onto the recording medium 20 as a series of stream data with frame data attached thereto. The audio signal processing block 15 reproduces the audio data sent from the built-in memory 14 into an analog audio signal, and outputs the analog audio signal through a speaker 17 built-in the camera body 1.

A key input block 18 includes plural operation keys such as a shutter button, a power key, and a MENU key, and outputs a key input signal to CPU 13 in response to key operation by a user. Note that the shutter button also serves as a recording start/stop button while the moving-image shooting operation is executed.

Each block mentioned above is controlled by CPU 13, and programs and data which are used by CPU 13 to control these blocks are stored in a program memory 19. The CPU 13 operates in accordance with the programs and the key input signal to serve as judging means, stop means, adjusting means, speed obtaining means, and parameter designating means. The program memory 19 comprises a re-writable non-volatile memory such as an EEPROM and a flash memory. In program memory 19 are stored from time to time setting data concerning a system and functions set by the user, such as a setting value of a recorded image quality (recording parameters including a compression system, a compression rate, a image size, and a frame rate) when a moving image is recorded.

The recording image parameters includes an image data volume, that is, an image size, a frame rate and a compression rate for determining data rate (maximum bit rate). The digital camera in the present embodiment allows the user to select a recorded image quality such as "fine", "normal" and "economy" and to set an image size, a frame rate and a compression rate corresponding to the selected recording image quality, when a moving image is recorded. In the present digital camera, setting values corresponding to the recorded image qualities are prepared for the recording image parameters, as shown in FIG. 2. Note that since [data rate=image size×frame rate×compression rate] is true, the values of the compression rate are shown in FIG. 2 for convenience. The image size and the frame rate are automatically adjustable, and therefore the above mentioned setting values provide a basis for automatic adjustment. Further, with respect to the image size and the frame rate, the user is allowed to select whether the automatic adjustment is set on or not.

Figure 3:
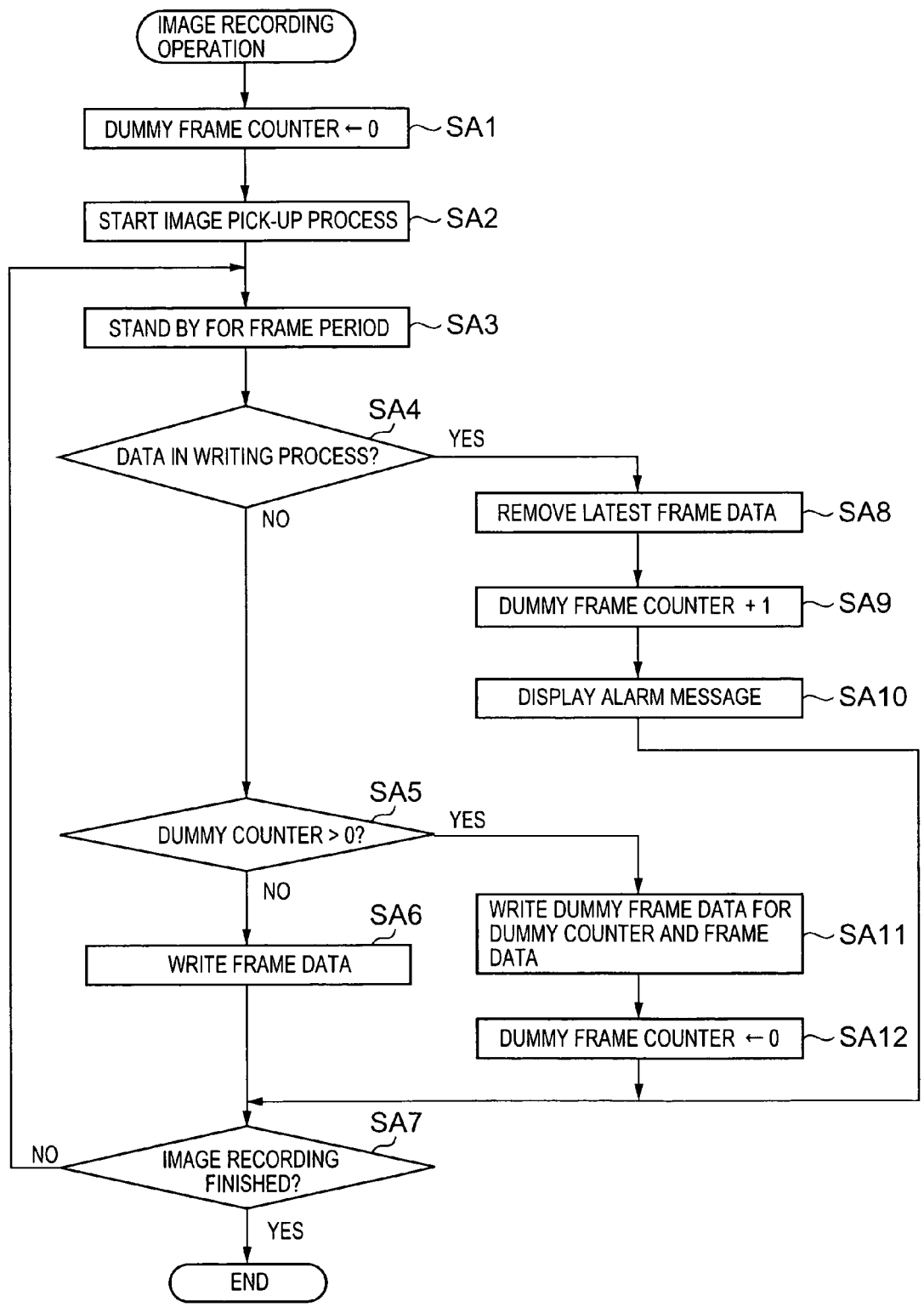
FIG. 3 is a flow chart of processes executed during an image-recording operation in the first embodiment.

Now, operation executed in the digital camera according to the present invention when a moving image is recorded (the image-recording) will be described. FIG. 3 is a flow chart of processes performed by CPU 13 during the image-recording. When an image-recording process starts upon start operation of the image-recording by the user, CPU 13 initializes a dummy frame counter recorded in a predetermined area in the built-in memory 14 at step SA1. The dummy frame counter is data indicating the number of the frame images among those picked up by CPU 13 which cannot be recorded (frame loss) because a time of writing data onto the recording medium 20 exceeds the frame rate. Hereinafter, it is assumed that the audio data can be recorded at all times no matter what kind of the recording medium 20 is used, because a time period in which the audio data obtained during the image-recording operation is written on the recording medium 20 is shorter than the frame data. Having started an image pick-up process at step SA2, CCD 3 stands by for a time period equivalent to a frame period at step SA3. Then, CCD 3 judges at step SA4 whether or not there exists data which is being written onto the recording medium 20. When there is no data which is still being written onto the recording medium 20 (NO at step SA4), a value of the dummy frame counter is referred. When the value of the dummy frame counter is "0" (NO at step SA4), compressed frame data is written onto the recording medium 20 at step SA6. Thereafter, as far as no operation is executed to cease the image-recording and there is left an empty area in the recording medium 20 (NO at step SA7), the operation returns to step SA3 and the above mentioned processes are repeatedly executed when the following frame period has been reached.

In the mean time, when there is data at the time when any frame period has been reached, writing operation of which data has begun last and has not yet been finished and which data is in writing operation onto the recording medium 20 (YES at step SA4), the compressed frame data recorded last on the built-in memory 14 is removed (over writing is allowed) at step SA8, and the dummy frame counter is incremented by "1" at step SA9. Further, an OSD function displays, at step SA10, on the LCD 12 an alarm message such as, for example, "data is being recorded at a reduced frame rate", notifying that a predetermined image quality is not secured, and the operation returns to step SA3 when no operation is executed to cease the image-recording operation (NO at step SA7). The processes at step SA8 through step SA10 are repeatedly executed even at the time when the following frame period has been reached, unless the data, the writing operation of which has started last (YES at step SA4) has not yet been written.

At the time when the following frame period has been reached after the processes at step SA8 through step SA10 are executed, when data, writing operation of which starts last has being written (No at step SA4), since the dummy counter is "1" or more (YES at step SA5), the operation advances to step SA11, where dummy frames specified by the dummy counter and the latest compressed frame data are written on the recording medium 20 at step SA11. In this case, it is assumed that these dummy frames are data for designating to retain a display of the previous frame and are extremely smaller in data volume than actual frame data. For example, when the moving image format is MPEG-4, frame data of "vop_coded=0" corresponds to such volume data.

Thereafter, when no operation is executed to cease the image-recording operation and there is left an empty area in the recording medium 20 (No at step SA7), after the dummy counter has been initialized at step SA12, the operation returns to step SA3, where the above mentioned processes are repeatedly executed, and then the process for the image-recording operation is finished at the time when the operation is executed to cease the image-recording operation or there is left no empty area in the recording medium 20 (YES at step SA7).

In the embodiment as described above, under condition that a writing rate at which data is written on the used recording medium 20 is decreased to a level considerably less than the previously intended rate due to difference in volume of an empty area or in an area where data is recorded, or difference in the environment where the recoding medium is actually used, including variations in voltage of the power source, or increase in burden to be processed by CPU 13, when a data-writing process for writing data on the recording medium 20 cannot be performed in time due to variations in size of frame data, dummy frames are recorded on the recording medium 20 in place of the actually picked up and compressed frame data. Therefore, when the process for writing frame data cannot be performed in time, the image-recording process is prevented from failure on a time axis while a normal image-recording operation is effected, by temporarily decreasing a superficial frame rate while the recorded moving image is reproduced. In other words, neither synchronization between the image and audio data is disturbed nor incorrect data is written. As a result, the upper limit of the recorded image quality which the user is allowed to set and the recorded image quality which is constantly set can be set on the high side. Therefore, the moving image can be recorded at the high image quality for a long time corresponding to empty capacity in the recording medium 20 without receiving influence by variations on the data writing rate and the usage environment.

Further, when the recording medium 20 of a high writing rate is used, a moving image may be recorded at the set up recorded image quality with no modification thereto.

In the present embodiment, there is no need to provide an area in the built-in memory 14 for recording data corresponding to plural frames of the compressed frame data, and therefore the built-in memory 14 can be used efficiently for the other processes during operation of the image-recording. Further, when the dummy frames are recorded on the recording medium 20 during the image-recording operation, the alarm message described above is displayed each time on the LCD 12, notifying the user that the set up image-recoding quality cannot be secured, whereby the user can use conveniently. Note that, for example, when a moving image is recorded with no sounds, modification may be made such that a predetermined alarm sound or an audio message is output through the speaker 17 in place of the display of the alarm message.

Furthermore, in the present invention, when the frame data cannot be recorded on the recording medium 20 in time, the dummy frames are recorded on the recording medium 20 and such dummy frames may be such data as the frame data of "vop_coded=0" in MPEG-4 format, which is extremely less in volume than the compressed frame data. But as the dummy frames may be used data which is substantially equivalent in data size to the compressed frame data. For example, when is Motion-JPEG is employed as the moving image format, the directly previous frame data, i.e. copy data may be used in place of the dummy frames, which may be determined depending on the moving image format. When copy data is used, information representing that the copy data is used is previously recorded in place of the frame data, copying process is executed based on the information after the image-recording operation has been completed. Since the number of the dummy frames in the image-recording operation is reduced as a time for writing the dummy frames is made shorter by reducing data size of the dummy frame, the superficial variations (frequency) in the frame rate may be suppressed, when the moving image is reproduced. As a result, a higher quality of the recorded moving image is secured.

Second Embodiment

Now, a second embodiment of the present invention will de described. According to the second embodiment, in the digital camera having the configuration as shown in FIG. 1, a moving image file to be recorded on the recording medium 20 is Audio Video Interleave file (AVI file).

Figure 4A:
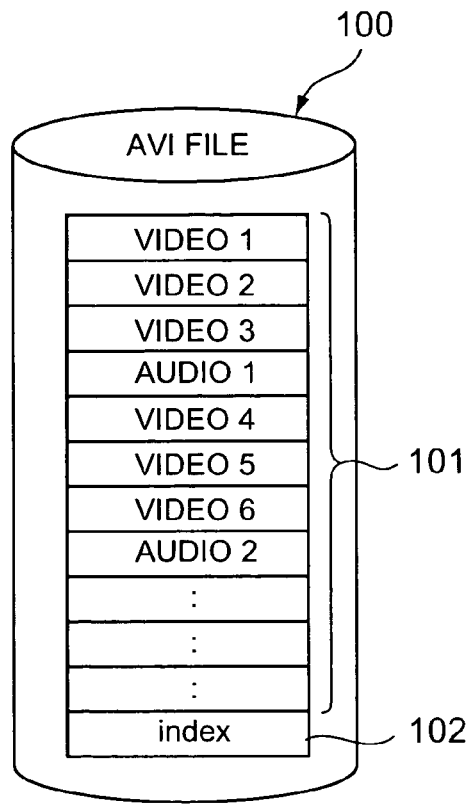
FIG. 4A is a view schematically showing AVI file in a second embodiment.

FIG. 4A is a view schematically showing a data construction in the AVI file 100 which is recorded in the second embodiment. The AVI file includes movi chunks (main data) 101 and an index chunk 102. Further, each movi chunk 101 consists of compressed frame data (hereafter, video data), i.e. three image chunks (video 1, video 2, video 3) and corresponding compressed audio data, i.e. one audio chunk (audio 1 in FIGS. 3. 4A and 4B). The index chunk 102 includes index information which indicates pointers and sizes each corresponding to the image chunk and audio chunk, and is arranged in the recorded order. In the reproduction of moving images, data of the image chunks and data of the audio chunks are reproduced in the arranged order of the index information.

Figure 4B:
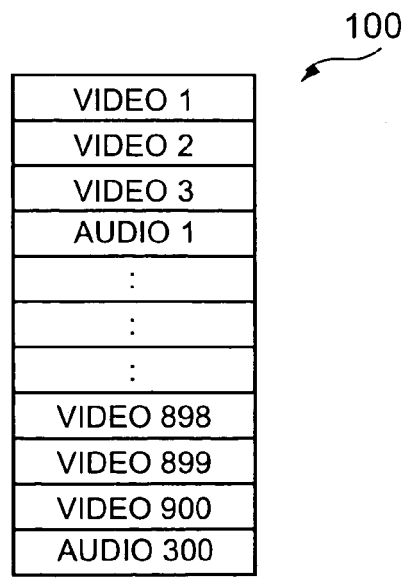
FIG. 4B is a view schematically showing an image-recording buffer in the second embodiment.

In the second embodiment, an image-recording buffer 110 is prepared in the built-in memory 14 for temporarily storing the image chunks and the audio chunks as shown in FIG. 4B. The image-recording buffer 110 is also used as the ring buffer, and has a size equivalent to the sum of a total data size of video and audio data corresponding to at least 60 seconds and a margin size in the present embodiment. It is assumed in the description given hereinafter that the size of the image-recording buffer 110 is determined by the following equation:

$$[(10\ kb \times 15) + 8000] \times 60 \approx 9.25\ kb + margin$$

where the video data is given by the following specifics: a frame rate=15 fps, an average data size of one frame=10 kb, and the audio data is given by the following specifics: a sampling rate frequency=8 kHz, a bit number per one sample=8 bits, and a monaural channel.

Figure 5:
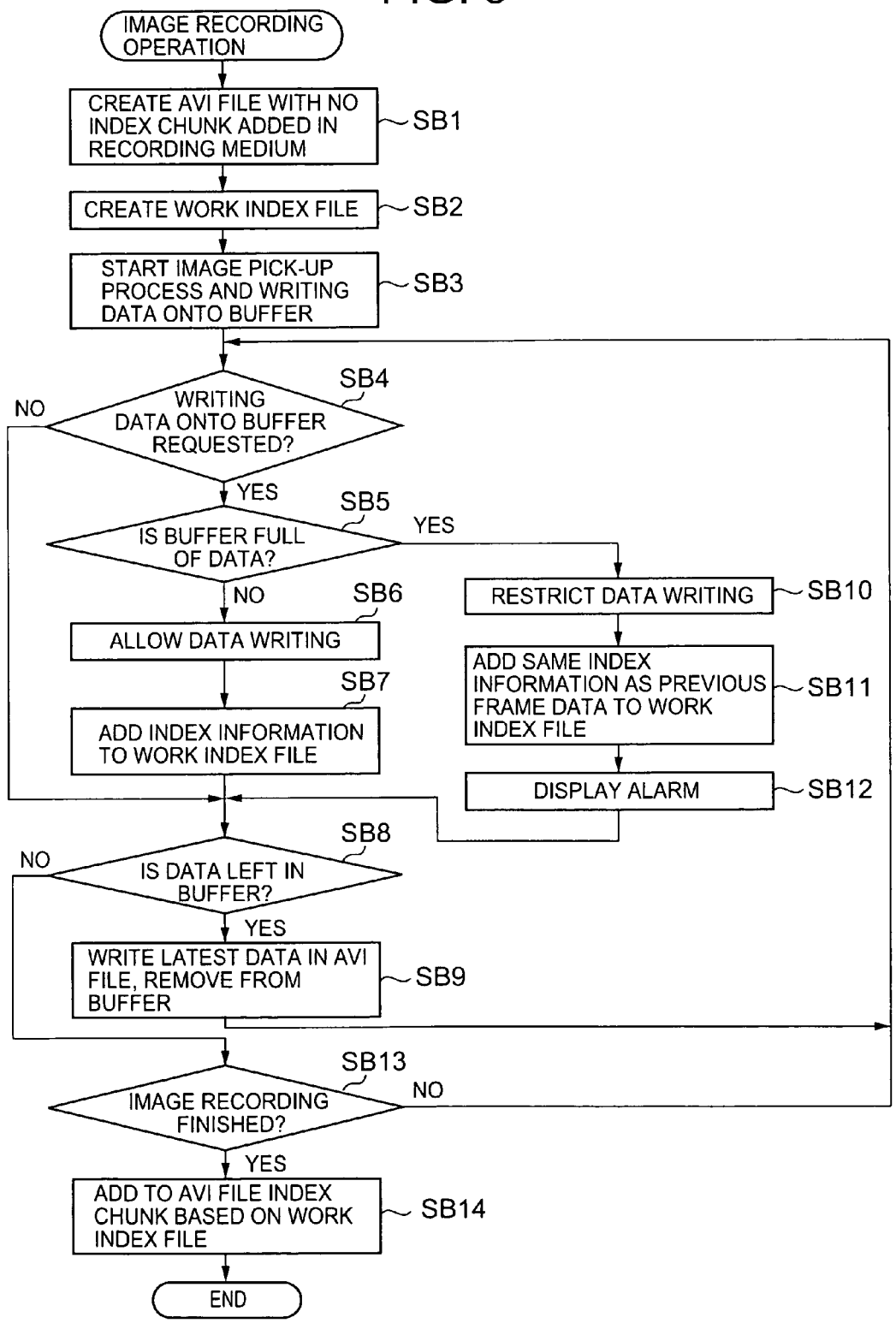
FIG. 5 is a flow chart of processes executed during an image-recording operation in the second embodiment.

Now, operation of the present invention performed when a moving image is recorded (image-recording) in the digital camera of the configuration mentioned above will be described. FIG. 5 is a flow chart showing processes performed by CPU 13 during the image recording.

When the image-recording process starts in response to an image-recording manipulation by the user, CPU 13 creates in the recording medium 20 an AVI file 100 with no index chunk added, including a provisional header chunk (not shown) at step SB1 in FIG. 5. Further, CPU 13 creates, at step SB2, in a predetermined area in the built-in memory 14 a work index file 120 (Refer to FIG. 6A and FIG. 6B) used for storing the index information, based on which an index chunk 102 to be added to the AVI file 100 after the image-recording is created. Then, CPU 13 starts the image pick-up process of CCD 3 and recording data (image chunk and audio chunk) on the image-recording buffer 110 at step SB3.

Every time a request for writing data on the image-recording buffer 110 is made by the data compression/expansion block 9 or the audio signal processing block 15 (YES at step SB4), it is judged at step SB5 whether or not the image-recording buffer 110 is full of data. Note that the judgment is made based on the judging standard as set forth below. That is, in case data of the image chunk is required to be written on the image-recording buffer 110, it is determined that the buffer 110 is full of data when no empty capacity is left therein, which capacity contains a volume equivalent to the sum of the data size of such data, the average data size of one audio channel and a margin. In case data of the audio chunk is required to be written on the image-recording buffer 110, it is determined that the buffer 110 is full of data when an empty capacity that is more than the data size of such audio chunk is not left therein. This is because it is necessary to secure, at all times, an empty capacity equivalent to a data size of one audio chunk in the image-recording buffer 110.

Since the image-recording buffer 110 is not full of data at the beginning of the image-recording operation (NO at step SB6), a process for writing data onto the image-recording buffer 110 is allowed at step SB6, and the index information indicating a pointer and a data size of the data written on the buffer 110 is added to the work index file 120 at step SB7. Further, data (leading data) that has been stored on the image-recording buffer 110 but has not yet been written into AVI file 100 (recording medium 20) is written into AVI file 100. The same data is removed from the image-recording buffer 110 (YES at step SB8, at step SB9), and the operation returns to step SB4. Then the processes mentioned above are repeatedly executed, whereby the image chunks and the audio chunks for plural frames are stored in AVI file 100 in the recorded order, and the index information relating to these chunks is stored in the work index file in the recorded order in the similar manner.

Figure 6A:
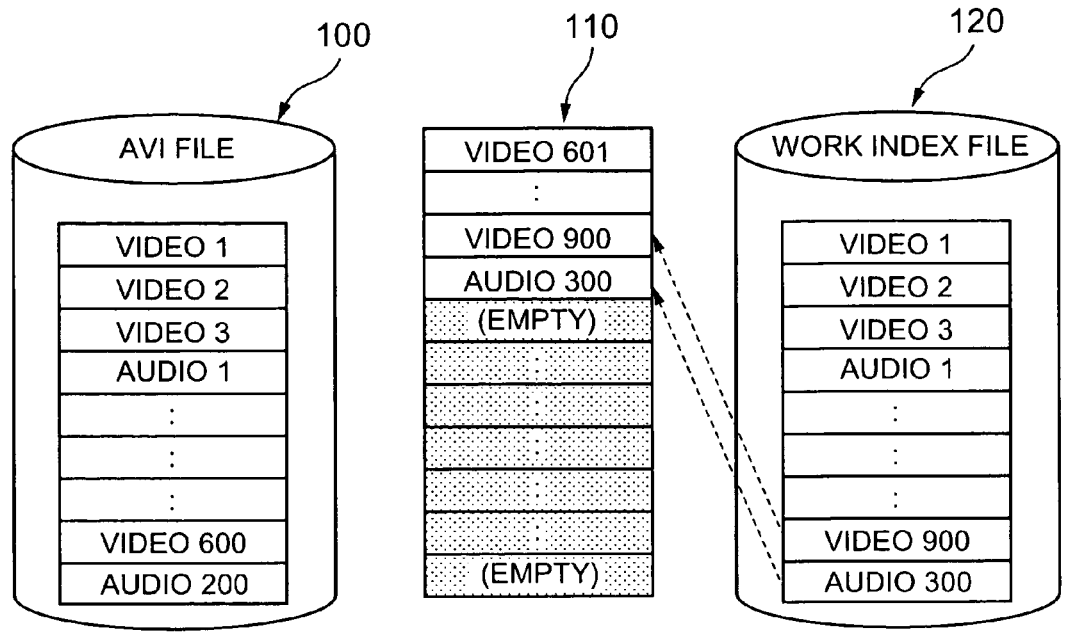
FIG. 6A is a view showing the image-recording buffer with an empty space left in the image-recording operation in the second embodiment.

The data writing process for writing data onto the image-recording buffer 110 (and addition of the index information) and the data writing process for writing data into AVI file 100 (and removal of data from the image-recording buffer 110) are performed out of synchronization. Actually, the data writing process for writing data onto the image-recording buffer 110 is executed every given frame periods (15 fps in the present embodiment), even though the data writing process for writing data into AVI file 100 has not yet been finished. Therefore, if there is a delay in data writing operation into AVI file 100, data which has not yet been written into AVI file 100 is stored on the image-recording buffer 110. FIG. 6A is a view showing, by way of example, the data stored in the files, i.e., the data which has been written onto the recording medium 20 at a rate (data writing rate) of 10 fps during a time period of 60 seconds. Since the frame rate is 15 fps in the present embodiment, data for two frames is written into AVI file 100 while the video data for three frames is stored in the image-recording buffer 110. Therefore, at the time when 60 seconds have lapsed, two third of data have been written into AVI file 100 and the remaining one third of data is still on the image-recording buffer 110 and the size will be about one third of the image-recording buffer 110. In the work index file 120, index information concerning all the data which has been written into AVI file 100 is stored. Meanwhile, while the above mentioned processes are repeatedly executed, when the image-recording buffer 110 has become full of data (YES at step SB5 in FIG. 5), a data writing process for writing data into the image-recording buffer 110 is restrained (prohibited) at step SB10 and the same index information as directly preceding frame data is added to work index file 120 at step SB11. In the present embodiment, since the buffer is judged based on the judging standard as described above, data to be removed or destroyed at step SB10 will be chunk data only.

Figure 6B:
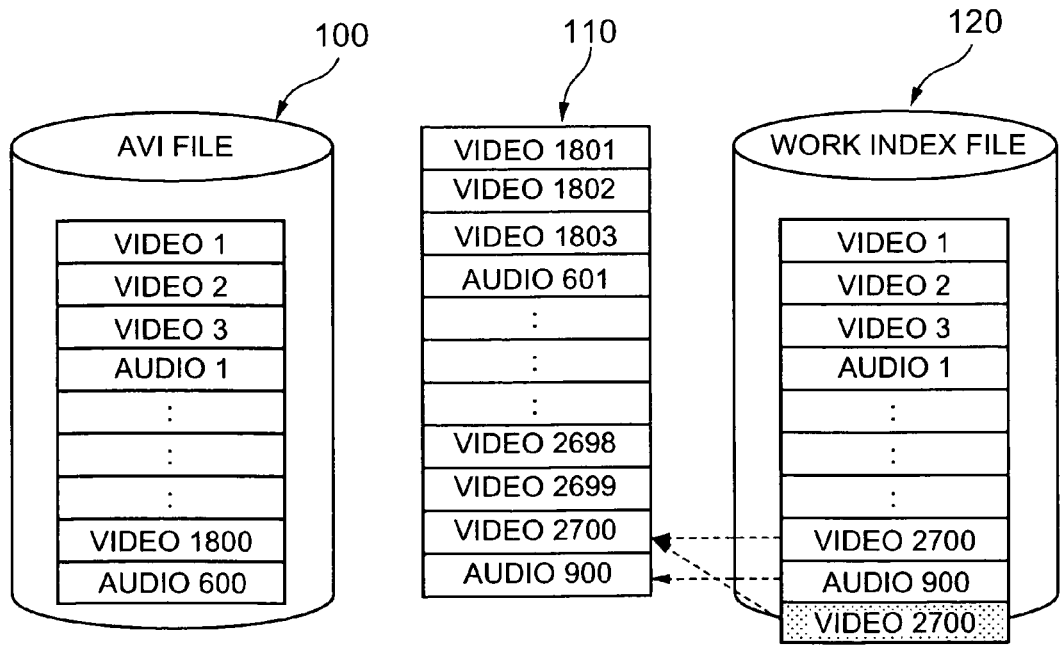
FIG. 6B is a view showing the image-recording buffer with no empty space left in the image-recording operation in the second embodiment.

FIG. 6B is a view showing, by way of example, the data stored in the files, i.e., the data which has been written onto the recording medium 20 at a rate (data writing rate) of 10 fps during a time period of 180 seconds. At the time when 180 seconds have passed, only data for 120 seconds is written into AVI file 100, and the remaining data (video 1801 through audio 900 in FIG. 6B) is still on the image-recording buffer 110. At this time, the image-recording buffer 110 has become full of data. Therefore, when a request is made to write new data onto the image-recording buffer 110, data in the image-recording buffer 110 still remains therein and index information of the directly preceding data (video 2700 in FIG. 6B) is added to the work index file 120 again.

Next, the OSD function displays, at step SB12, on the LCD 12 an alarm message such as "image is recorded at a reduced frame rate", notifying that the set up image quality cannot be secured. Then, the operation advances to step 8, and thereafter CPU 13 keeps writing data into AVI file 100 at step SB9 as far as data is left in the image-recording buffer 110 (YES at step SB8) regardless of whether or not an operation is executed to stop the image-recording process. If the operation for stopping the image-recording process has already been executed at the time when the image-recording buffer 110 becomes empty (No at step SB8 and YES at step SB13), index chunk is created based on the data in the work index file 120 and the created index chunk is added to AVI file 100 to complete AVI file 100 at step SB14, whereby completing all the image-recording process. In the present embodiment describe above, when a new image chunk cannot be stored in the image-recording buffer (link buffer) 110 due to delay in data writing onto the recording medium 20 accompanied by variations in size of the frame data under the condition in which the data writing rate is greatly reduced to a level lower than an intended rate due to the above described causes, index information indicating the directly preceding image chunk is recorded in the index chunk.

Therefore, in case that the digital camera in the present embodiment is brought to a state in which a new image chunk cannot be stored on the image-recording buffer 110, the image-recording process is prevented from temporal failure by temporarily reducing the superficial frame rate in reproduction of the recorded moving image with the normal recording operation of a moving image maintained. As a result, the user can set on the high side the upper limit of the recorded image quality that the user is allowed to set and the recorded image quality that is fixedly set.

In the present second embodiment, the moving image can be recorded with a higher image quality for a long time period corresponding to the empty space in recording medium 20 with no influence yielded by variations in the data writing rate and a using state, substantially in same manner as in the first embodiment. In addition, in case the recording medium 20 on which data can be written at a high writing rate is used, the moving image can be recorded at the previously set image quality without any trouble. If a trouble should happen during the image-recording operation, that prevents a new image chunk from being stored on the image-recording buffer 110, the alarming message is displayed on LCD 12, notifying the user that the previously set image quality is not secured. The digital camera according to the second embodiment is used conveniently.

Further, in the present embodiment, the image-recoding buffer 110 for storing image chunk for plural frame data is prepared on the built-in memory 14, and when the image-recording buffer 110 is used as a ring buffer, the frame rate set as the frame rate in the reproduction of the moving image can be secured during a certain period of time (60 seconds in the present embodiment) at the beginning of the image-recording, for example, even though the rate at which data is written onto the recording medium 20 is less than the previously set frame rate from the beginning of the image recording. With respect to the above mentioned, the digital camera is used conveniently.

In the present embodiment, the case has been described that the moving image file to be recorded on the recording medium 20 is AVI file, but as the format of the moving image file, a file of other format may be used as far as the file accompanies the index information indicating a reproducing order of the frame data.

In case a moving image is recorded as AVI file 100 as in the present embodiment, or the moving image is recorded as a file accompanying other index information, there is no need to prepare the image-recording buffer 110 on the built-in memory 14, and an arrangement may be made such that the compressed frame data is directly written onto the recording medium 20 similarly as described in the first embodiment. In this case, judgment of whether there is a delay in data writing onto the recording medium 20 or not may be made based on the same judging standard used in the first embodiment. The work index file 120 may be prepared at any location on the image-recording medium 20 in the first embodiment, and the work index file 120 may be prepared in a similar manner in the present second embodiment.

Apart from the mentioned above, an arrangement may be made such that one corresponding to the image-recording buffer 110 in the present embodiment is provided on the those described in the first embodiment, and that it is judged based on the similar judging standard to that in the first embodiment, whether there is a delay in operation of data writing on the recording medium 20 or not.

Further, in the present embodiment, it is determined that there is a delay in data writing onto the recording medium 20, when the image-recording buffer 110 becomes full of data. But it will be possible to determine that there is a delay in the operation of data writing onto the recording medium 20 when the empty capacity of the image-recording buffer 110 is reduced to a level less than a predetermined amount. With this arrangement, the frame rate to be reduced may be made small when the frame rate is temporarily reduced. In other words, the normal recording operation of a moving image is possible without abruptly reducing the frame rate and a higher recorded image quality can be secured.

In the embodiment, the compressed image data (frame data) is successively stored on the image-recording buffer 110, but the image data which has not been subjected to compression may be successively stored on the image-recording buffer 110.

As described in the first and second embodiment, when there is a delay in data writing operation, a process for temporarily reducing the superficial frame rate in the reproduction of a moving image reduces data amount to be written, but separately from kr simultaneously with such process, the data amount may be reduced by changing an image-recording parameter (compression rate, image size and the like) other than the frame rate.

Further, in the first and second embodiment, the digital camera with the moving-image shooting function of the invention has been described, but the present invention may be employed in any other apparatus which is provided with a stream recording configuration for recording a moving image in the image-recording operation, including various electronic camera apparatuses such as a digital video camera, a cellular phone with a camera function, PDA with a camera function, and a personal computer with a camera. In this case, the similar effects described above may be obtained.

The moving images to be compressed and recorded in an arbitrary format may be not only those of a movie but also those input through a video input terminal such as images of an analog television broadcasting program. Not only a semiconductor memory but also a hard disk may be used as the recording medium on which the moving images are recorded.

Third Embodiment

Figure 7:
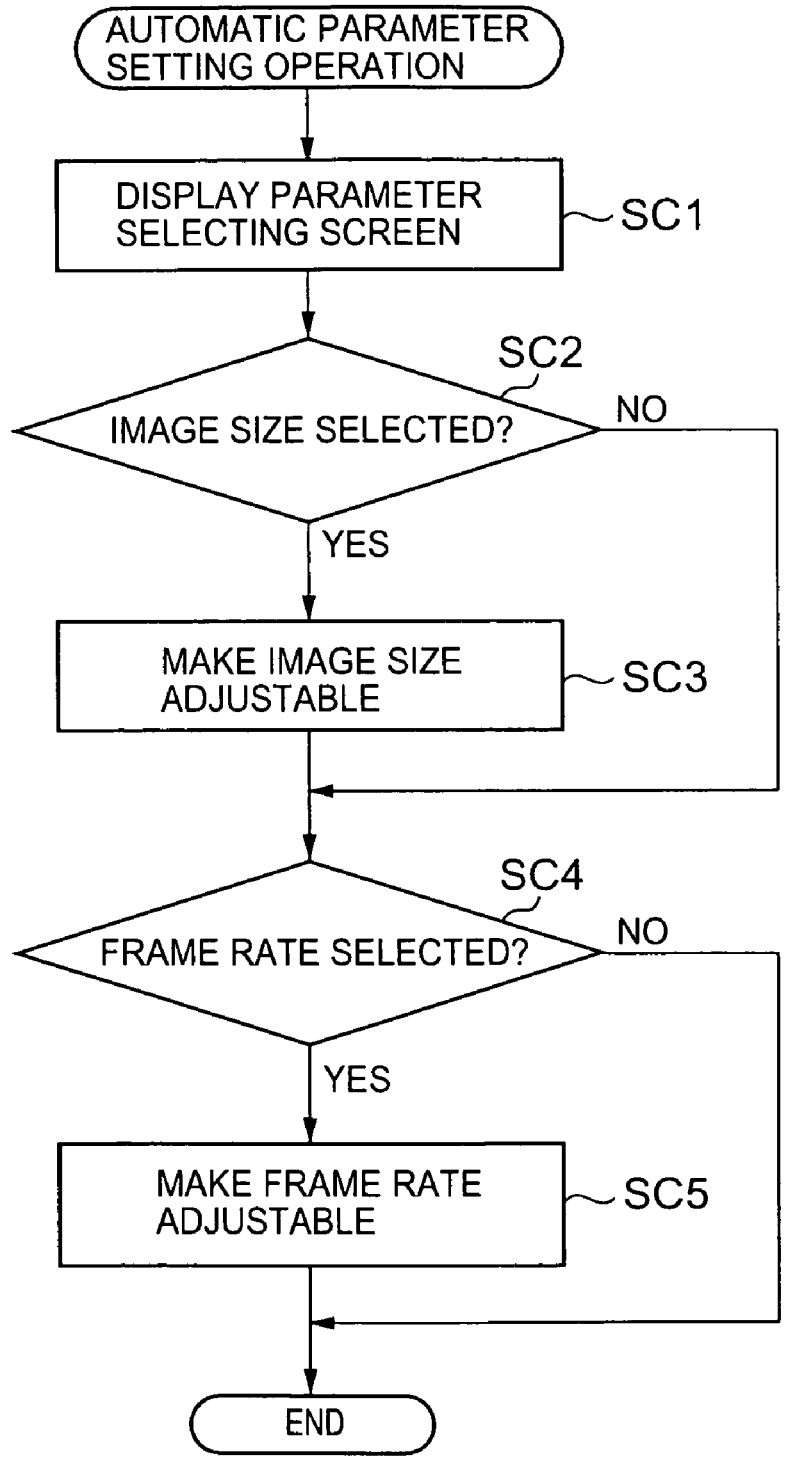
FIG. 7 is a flow chart of a parameter setting process for an automatic adjustment in a third embodiment.

Now, a third embodiment of the present invention will be described. FIG. 7 is a flow chart of a parameter setting process for an automatic adjustment. The parameter setting process is executed by CPU 13 when a setting mode is selected from among various setting modes by the user at a certain time to set image-recording parameters for the automatic adjustment in the moving image shooting operation.

When the setting mode is selected, CPU 13 displays a parameter choosing screen on LCD 12, allowing the user to choose image-recording parameters (image size, frame rate) for the automatic adjustment at step SC1 in FIG. 7. When an image size is chosen (YES at step SC2), the image size is set to be automatically adjustable at step SC3, and further when a frame rate is chosen (YES at Step SC4), the frame rate is set to be automatically adjustable at step SC5. The image size and the frame rate are set to be automatically inadjustable at the initial setting while the image-recording parameters which have not been chosen remain inadjustable. The setting conditions are stored on a program memory 19.

Figure 8:
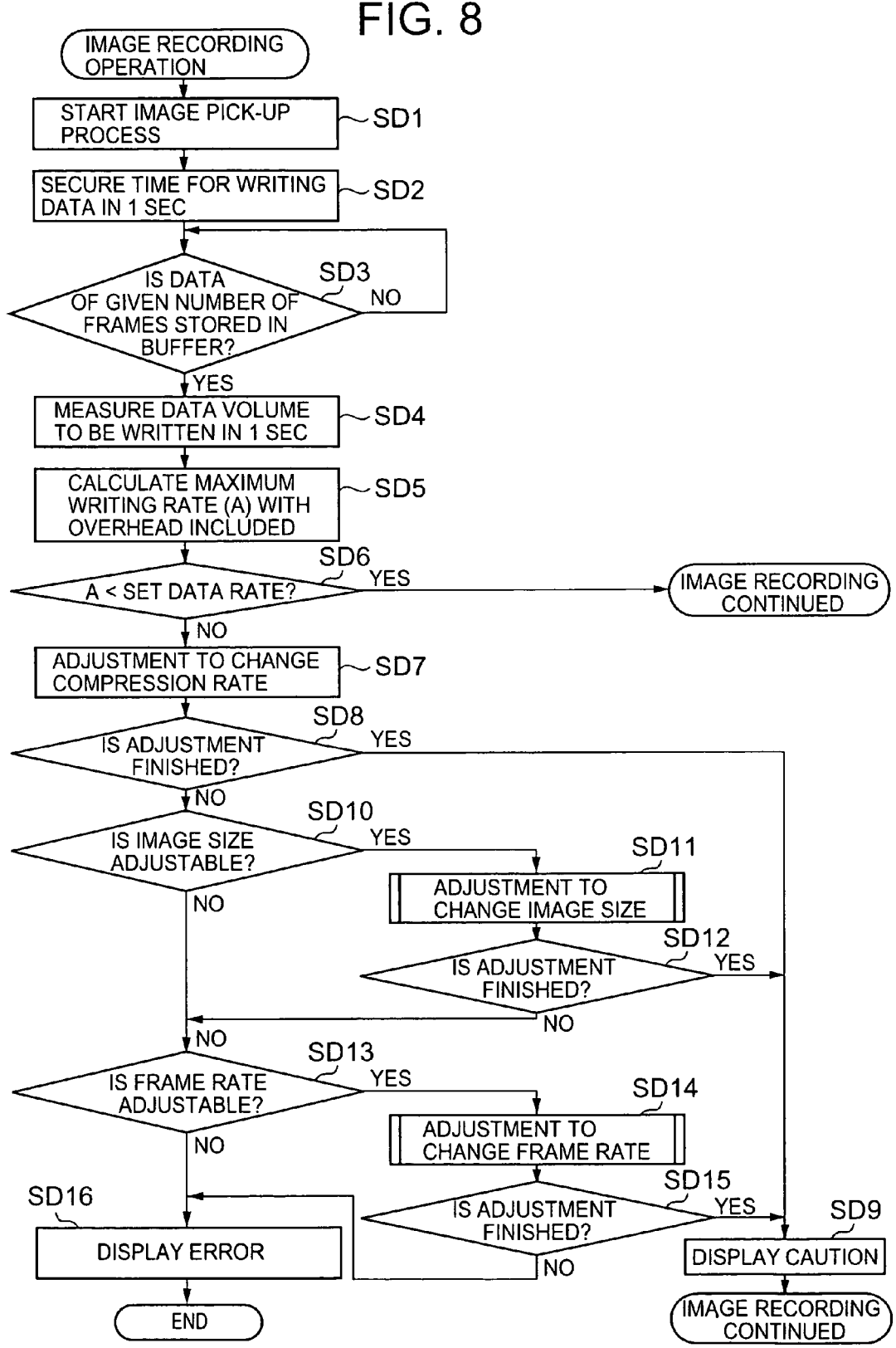
FIG. 8 is a flow chart of processes executed during the image-recording operation in the third embodiment.

FIG. 8 is a flow chart showing a process, which is executed by CPU 13 mainly with respect to the automatic adjusting process of the image-recording parameters in the image-recording operation when the user performs operation to start the image-recording operation.

The digital camera starts an image pick-up process in response to manipulation to start the image-recording operation at step SD1, and then secures a time (net writing time) used for data writing process within a unit time (1 second) at step SD2. Assuming that in the process, a time for an audio compression process executed during the image-recording operation is almost constant and that filing process of audio data and other processes take little time, the net writing time can be calculated using an equation as follows:

[Net writing time=1−a time for the audio compression process within 1 second (constant)−an operation margin (constant)]

Then, data for given number of frames is stored on the buffer (built-in memory 14) (YES at SD3). The data for given number of frames stored in the buffer, i.e. the frame data compressed based on the image-recording parameters corresponding to the recorded image quality set at the time is written on the recording medium 20. Then, data volume (unit data volume) which can be written on the recording medium 20 within 1 second is obtained using an equation as follows at step SD4:

[Unit data volume=written data volume/time required for writing data]

Next, the maximum writing rate (A) including an overhead concerning the recording medium 20, i.e. the substantial data rate is calculated at step SD5 based on the net writing time calculated at step SD2 and the unit data volume obtained at step SD4.

[Maximum writing rate (A)=net writing time/unit data volume]

Thereafter, it is judged at step SD6 whether or not the calculated maximum writing rate is less than the present data rate, i.e. a data rate given in the image-recording parameters (standard setting values) for the recorded image quality mode. When YES at step SD6, that is, when, for example, the recorded image quality mode is set to "fine", the net writing time is 0.8 seconds and a measured data volume is less than 640 kb, it is determined that the image-recording operation may be performed with the present recorded image quality and a normal image-recording process is continued with no change made. When NO at step SD6, it is determined that the normal image-recording operation cannot be performed with the present recorded image quality and the adjustment process is executed to change the compression rate in the image-recording parameters at step SD7.

Figure 9:
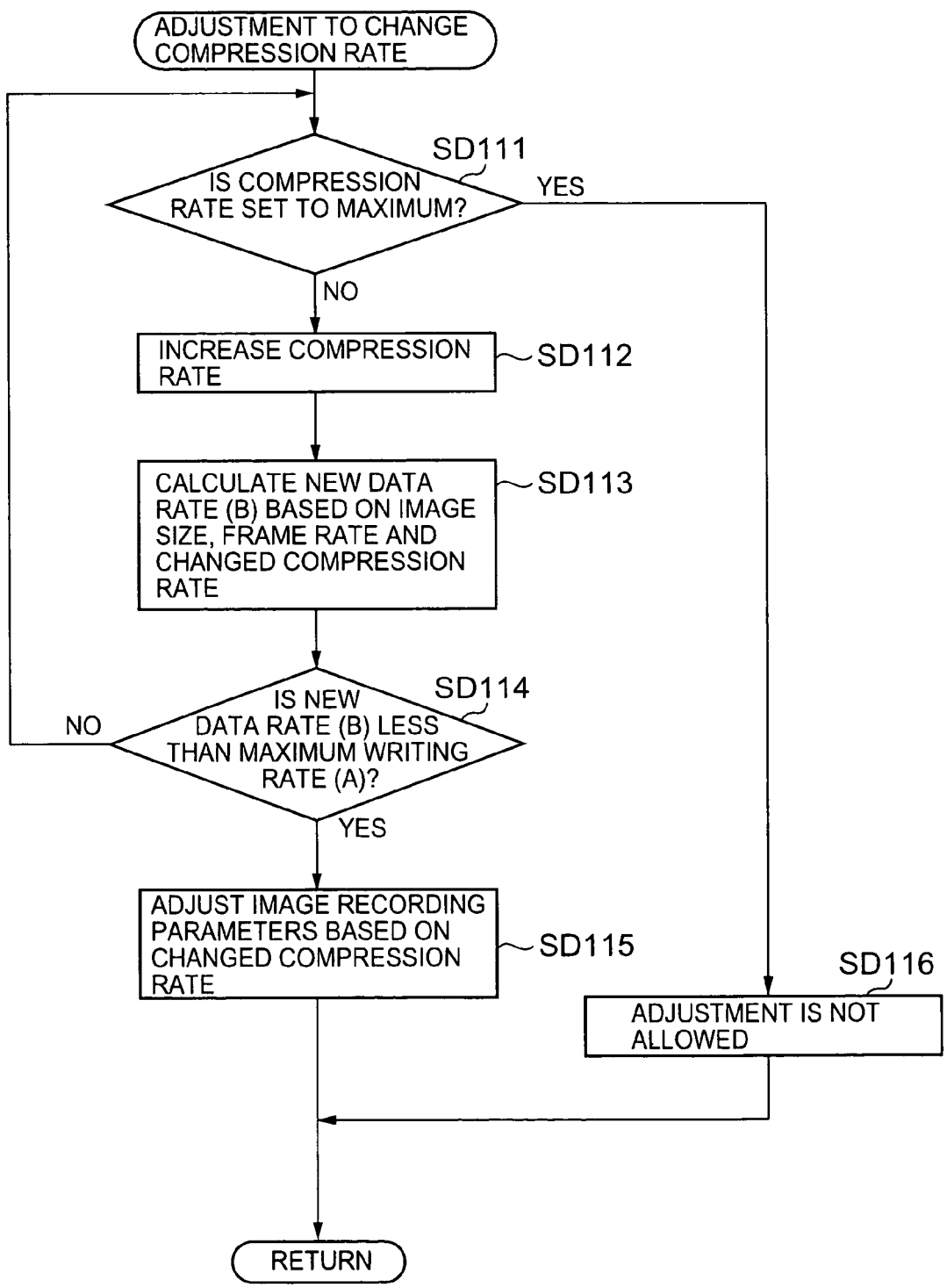
FIG. 9 is a flow chart of an adjustment process when a compression rate is changed.
Figure 10:
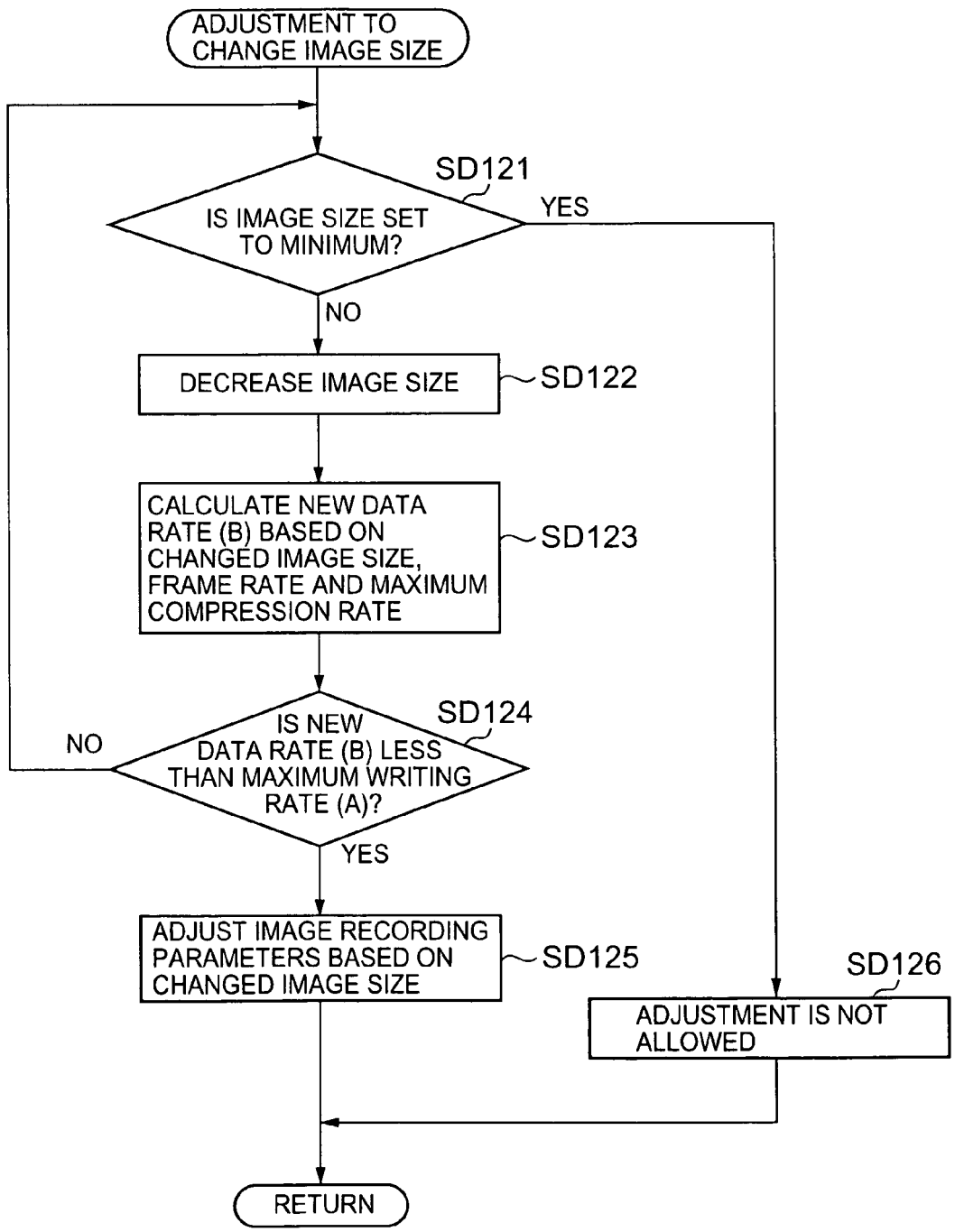
FIG. 10 is a flow chart of an adjustment process when an image size is changed.

In the adjustment process, as shown in the flow chart of FIG. 9, the compression rate set correspondingly to the recorded image quality mode is successively increased at step SD112, for example, by ¼, ⅙, ⅛, . . . until it reaches the allowable maximum compression rate (NO at step SD111). At step SD113, another data rate (B) is calculated based on set up image size, frame rate and the increased compression rate, and it is judged at step SD114 whether or not the calculated another data rate (B) is less than the maximum writing rate (A). When it is determined at step SD114 that the calculated data rate (B) is less than the maximum writing rate (A), the image-recording parameters are updated based on the increased compression rate at step SD115. It is determined that the adjustment has been completed, and the operation returns to the process of FIG. 8. Meanwhile, in case that, even though the compression rate is changed to the maximum compression rate, it is not true at step SD111 that the changed data rate (B) is less than the maximum writing rate (A), then it is determined at SD116 that the adjustment is not allowed, and the operation returns to the process shown in FIG. 8.

When the compression rate is changed and the adjustment is completed (YES at step SD8), an alarm message of "Moving image is recorded at the recorded image quality poorer than the set up recorded image quality" is displayed on LCD 12 at step SD9, and the image-recording operation is continued based on the adjusted image-recording parameters. When the adjustment is not allowed even though the compression rate is changed (No at step SD8), it is judged at step SD10 whether or not the image size is automatically adjustable. When the image size is adjustable (YES at step SD10), the adjusting process is executed at step SD11 to adjust the image size among the image-recording parameters.

In the image size adjusting process, the image size set correspondingly to the recorded image quality mode is successively reduced at step SD122 to the allowable minimum size. A new data rate (B) is calculated at step SD123 based on the reduced image size, the set frame rate and maximum compression rate, and it is judged at step SD124 whether it is true that the calculated data rate (B) is less than the maximum writing rate (A) or not. When it is true that the calculated data rate (B) is less than the maximum writing rate (A) (YES at step SD124), the image-recording parameters are updated based on the image size set at the time at step SD125, and the adjustment has been finished and the operation returns to the process shown in FIG. 8. Meanwhile, in case that, even though the image size is reduced to the minimum size, it is not true at step SD121 that the changed data rate (B) is less than the maximum writing rate (A), then it is determined at SD126 that the adjustment is not allowed, and the operation returns to the process shown in FIG. 8.

In case that only two image sizes, 640×480 and 320×240 are prepared as shown in FIG. 2, when the image size is set to 320×240 (minimum size) in the recorded image quality mode, it is determined that the adjustment is not allowed and the operation automatically returns to the process shown in FIG. 8.

When the image size is changed and the adjustment has been completed (YES at step SD12), a similar alarm message is displayed on LCD 12 at step SD9, and the image-recording operation is continued based on the adjusted image-recording parameters.

When the image size cannot be changed (NO at step SD10) and the adjustment is not allowed (NO at step SDS12), it is judged at step SD13 whether or not the frame rate is automatically adjustable. When the frame rate is adjustable (YES at step SD13), the adjustment process is executed at step SD14 to change the frame rate of the image-recording parameters.

Figure 11:
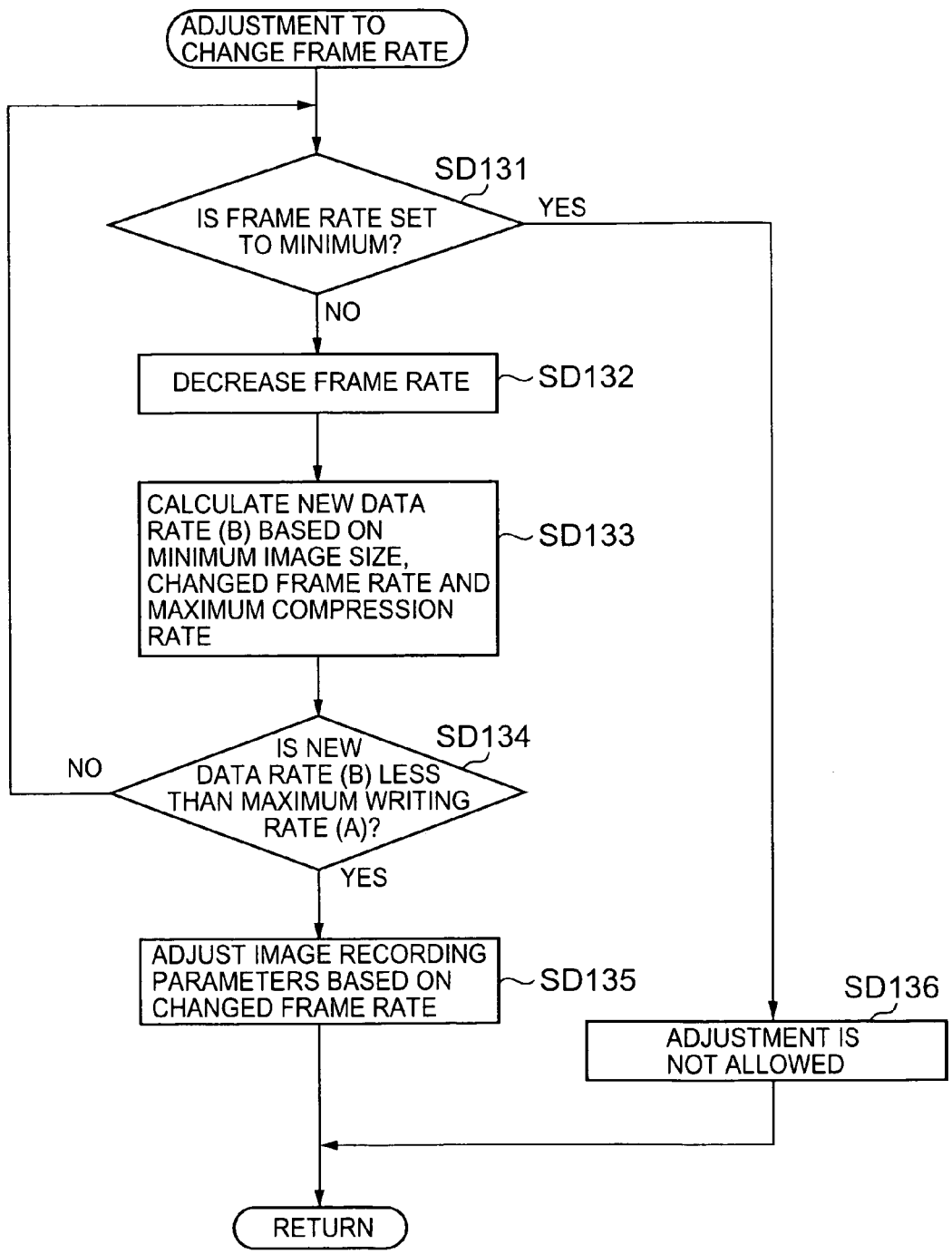
FIG. 11 is a flow chart of an adjustment process when a frame rate is changed.

In the adjustment process for changing the frame rates shown in FIG. 11, the frame rate, which has been set correspondingly to the recorded image quality mode, is successively reduced at step SD132, for example, by 15 fps, 10 fps, 5 fps, 1 fps (thereafter, reduced by one frame per two seconds, one frame per three seconds, and so on) until it reaches the minimum of the adjustable frame rate (when NO at step SD131). A step SD133, a new data rate (B) is calculated based on the minimum image size, changed frame rate, and the maximum compression rate, and then it is judged at step SD134 whether the new data rate (B) is less than the maximum writing rate (A) or not. When it is determined that it is true that the new data rate (B) is less than the maximum writing rate (A) (YES at step SD134), the image-recording parameters are updated at step SD135 based on the frame rate at the time, and the adjustment process has been completed and the operation returns to the process of FIG. 8. Meanwhile, when it is true that the new data rate (B) is not less than the maximum writing rate (A) (YES at step SD131) even though the frame rate has been changed to the minimum rate, it is determined at step SD136 that the adjustment is not possible, and the operation returns to the process of FIG. 8. When the frame rate has been changed and the adjustment process has been completed (YES at step SD15), an alarm message similar to the described above is displayed on LCD 12 at step SD9, and the image-recording process using the adjusted image-recording parameters is continued. When the adjustment of the frame rate is not possible (NO at step SD13) or when the adjustment has not been completed (NO at step SD15), an error message such as "Image-recording parameters are not automatically adjusted" is displayed on LCD 12. Change the image-recording parameter to be automatically set. The image-recording is ceased at step SD16. And thereafter, the image-recording process is ceased.

In the present embodiment described above, when it is determined after the moving image operation has started, that the data writing rate (feature) onto the recording medium 20 is less than the data rate which is set by the user correspondingly to the recorded image quality, the standard setting values of the image-recoding parameters previously set correspondingly to the recorded image quality are automatically adjusted, whereby the data rate at the image-recording operation is reduced to a level less than the data writing rate on the recording medium 20. Therefore, even if a recording medium 20 whose data writing rate is slow is used, the data writing process is prevented from temporal failure during the moving-image recording operation. Even in the digital camera has a structure in which plural sorts of recording media each having a different data writing rate can not be installed, a normal moving-image recording operation can be performed without failure. Further, the present embodiment makes use of the data writing feature of the installed recording medium 20 to perform the image-recording operation of the high image quality.

Furthermore, in the present embodiment, frame data is created during the image-recording operation, and the data writing rate onto the recording medium 20 is set to the maximum writing rate calculated based on the data amount of the created frame data actually written onto the recording medium 20 per second and a time duration (net writing time including a time for overhead) for writing data onto the recording medium 20 excluding a time for operation other than the data writing operation, and therefore an data writing rate onto the recording medium 20 which is accurate and on which data recording state on the recording medium 20 is reflected is obtained. The present embodiment makes use of the data writing feature of the recording medium 20 and allows the image-recording of a high image quality.

In the present embodiment, the setting mode is prepared for setting the image-recording parameters which allow automatic adjustment in the moving-image recording operation, and the user is allowed to previously select the image size or the frame rate from among the image-recording parameters as the parameter to be automatically adjusted. Therefore, the data-writing features of the recording medium 20 are used to perform the image-recording operation of a high image quality with the user intended image quality, and the user can record a moving image having his or her intended image quality.

When any of the image-recording parameters is automatically adjusted, the user can be informed by the alarm message that the previously set image quality cannot be maintained. Further, when the data rate during the moving-image recording operation cannot be adjusted to a level less than the data writing rate onto the recording medium 20, exceeding adjustable ranges of all the adjustable image-recording parameters, the user can be informed by the error message that the image-recording of the previously set less image quality cannot be performed. In this way, the digital camera according to the present invention is used conveniently.

In the present embodiment, when the time (net writing time) for writing data during one second at step SD2 in FIG. 8 is obtained, a time, such as a time for audio compressing process and an operation margin, other than the time for writing data onto the recording medium 20 is used as a constant parameter. But when such time cannot be fixed, an arrangement may be made such that a time required for frame processing or displaying process, other than the time for data writing process is measured, and that the measured time is used.

In the present third embodiment, the maximum writing rate onto the recording medium 20 is obtained at the time when the image-recording operation starts, and the image-recording parameters are adjusted based on the obtained maximum writing rate, but an arrangement may be made such that the maximum writing rates are obtained every certain interval or every time when a certain volume of stored data is reached, and that the image-recording parameters (compression rate) are automatically adjusted based on the obtained writing rates. In that case, even though the maximum writing rate varies from time to time due to the data recorded state on the recording medium 20, the accurate maximum writing rate is obtained, and therefore the most of the data writing feature depending on the data recorded state is used to record a moving image at a high image quality.

Further, in the present embodiment, when the automatic adjustment of the image-recording parameters is required, the parameters are adjusted in the predetermined order of priority such as the compression rate, image size, and frame rate. But an arrangement may be made such that CPU 13 is made to function to set the priority order and that the user is allowed to set the priority order. In that case, the data writing feature of the recording medium 20 is used to record the moving image having a high image quality with the user intended sort of image quality, and the user can record the moving image having the user intended image quality. Further arrangement may be made such that the image-recording parameters are chosen for the automatic adjustment, and that the priority order thereof is determined at the same time, or such that only the priority order of the parameters is determined, or on the contrary such that the parameters are not chosen by the user for automatic adjustment.

Furthermore, automatically adjustable image-recording parameters are not limited to those mentioned above but may be those specifying image data amount written onto the recording medium 20 during a certain period of time. For example, when data compressing system is employed, in which moving image data is compressed in plural compression formats, arrangement may be made such that the compression formats are used as the image-recording parameters and that image data amount to be written on the recording medium 20 in a certain period of time is controlled based on the compression format. But the compression format cannot dynamically be adjusted during the moving-image recording operation. The plural image-recording parameters are not necessarily needed, but a single specific parameter such as the compression rate may be enough.

Fourth Embodiment

Figure 12:
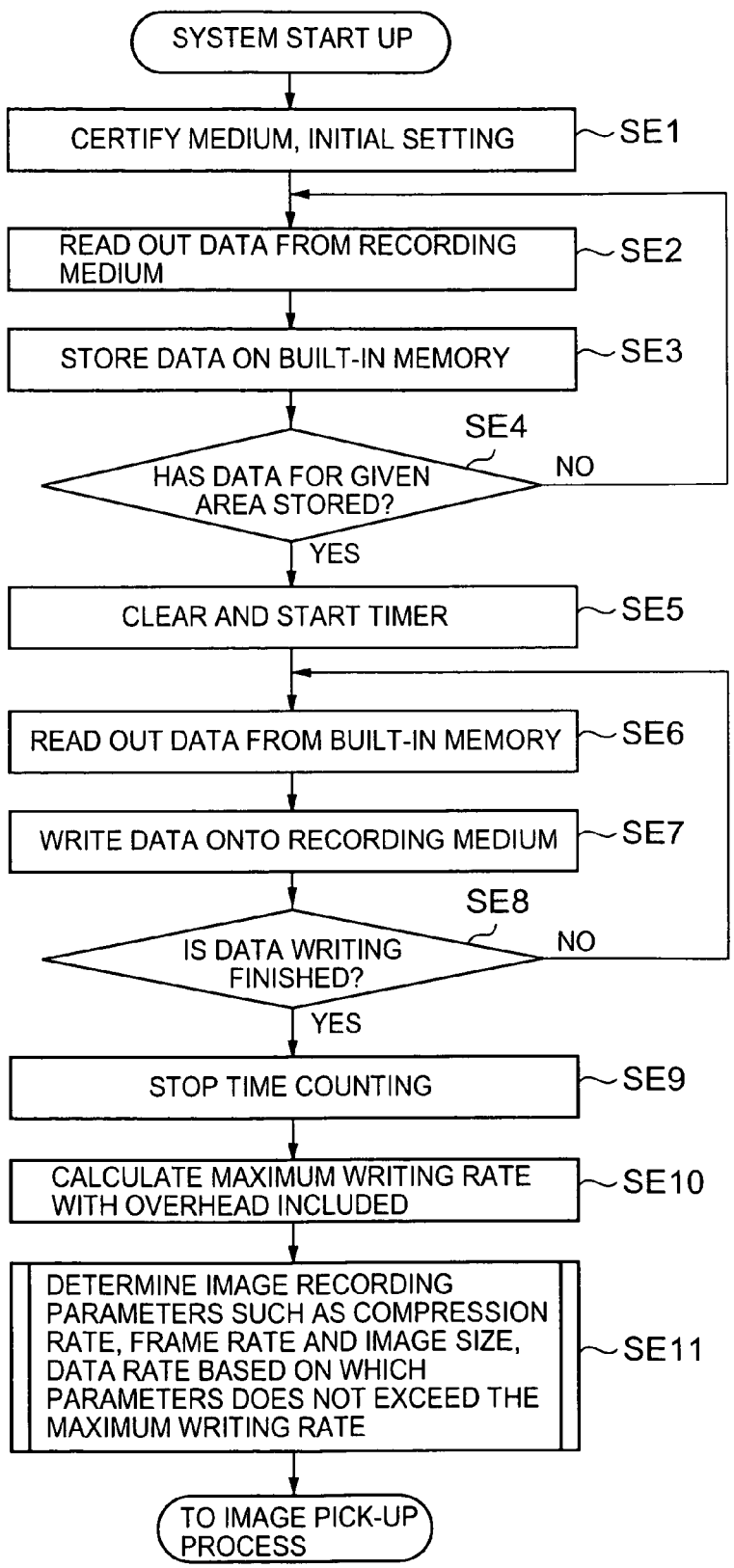
FIG. 12 is a flow chart of operation executed when a system starts up in a forth embodiment.

Now, a fourth embodiment of the present invention will be described. The forth embodiment relates to a digital camera in which image recording parameters are automatically set before the moving image shooting operation starts. The digital camera according to the present embodiment has the same configuration as shown in FIG. 1. On the program memory 19 is recorded a program which makes CPU 13 execute the processes as will be described below to serve as a rate obtaining unit, adjusting unit, recorded image quality selecting unit, and a image quality restricting unit. In a given area of the recording medium 20 is recorded measurement data which is used when data-writing rate is measured as will be described later. Now, operation of the digital camera according to the fourth embodiment of the invention will be described. FIG. 12 is a flow chart of processes which are executed by CPU 13 to set an image quality of a moving image after a main power source is turned on when the system starts up. The flow chart shows by way of example processes performed when the main power source is turned on in a moving image shooting mode.

CPU 13 starts its operation when the system starts us. CPU 13 certifies the recording medium 20 and initializes the system. Now, the recording medium 20 is made available at step SE1 in FIG. 12. CPU 13 reads out the measurement data from the certain area of the recording medium 20 at step SE2 and successively stores the read out measurement data on a built-in memory at step SE3 until all the measurement data for the certain area of the recording medium 20 has been written onto the built-in memory at step SE4.

When all the measurement data for the given area of the recording medium 20 has been stored on the built-in memory (YES at step SE4), a timer function is made to start a time counting operation based on a system clock at step SE5. CPU 13 reads out the measurement data from the built-in memory at step SE6 and starts writing the read out measurement data in the given area of the recording medium 20 at step SE7. The measurement data is written in the substantially same manner as the moving image data (stream data) is written during the moving image recording operation.

When all the measurement data has been written (YES at step SE8), the time counting operation by the timer function ceases at step SE9. Then the maximum data-writing rate for writing data onto the recording medium is calculated based on the results of the time measurement at step SE10, in which overheads are taken into consideration. For example, File Allocation Table (TAT) is used as a file system, a time used only for writing the moving image data is calculated from the measured time, in which table reference, dispersion of data writing sectors, writing in unit of cluster are taken into consideration. Then, a data-writing rate is calculated from the calculated time and data amount written onto the recording medium 20, and the calculated data-writing rate is used as the maximum data-writing rate.

Values of the image recording parameters such as a compression rate, frame rate, and image size, which are used in the moving image recording operation are determined (set) based on the calculated maximum data-writing rate, such that the data-writing rate, i.e. data rate (maximum bit rate) determined using such compression rate, frame rate, and image size, and required in the normal moving image recording operation does not exceed the calculated maximum data-writing rate. The determined values of the image recording parameters are recorded on the program memory 19 at step SE11. In other words, an image quality of the moving image to be recorded is automatically set, and then the operation advances to the image pick-up process by CCD 3 to shoot the moving image.

At the process of step SE11, the image-recording parameters may be determined in any manner. For example, the data rate is determined by setting the compression rate, frame rate and image size to allowable maximum values respectively. Then, the value of the compression rate is gradually increased in the same manner as in the first embodiment, as far as the data rate does not exceed the maximum data-writing rate. When such data rate exceeds the maximum data-writing rate even though the data rate reaches the allowable maximum value, the final values of the image-recording parameters are determined by decreasing the value of the image size and then decreasing the value of the frame rate. The operation is described, that is performed when the power source is turned on in the moving-image shooting mode. But even in case the power source is turned on with a mode other than the moving-image shooting mode set, all the processes at steps SE1 through SE11 are executed.

Figure 13:
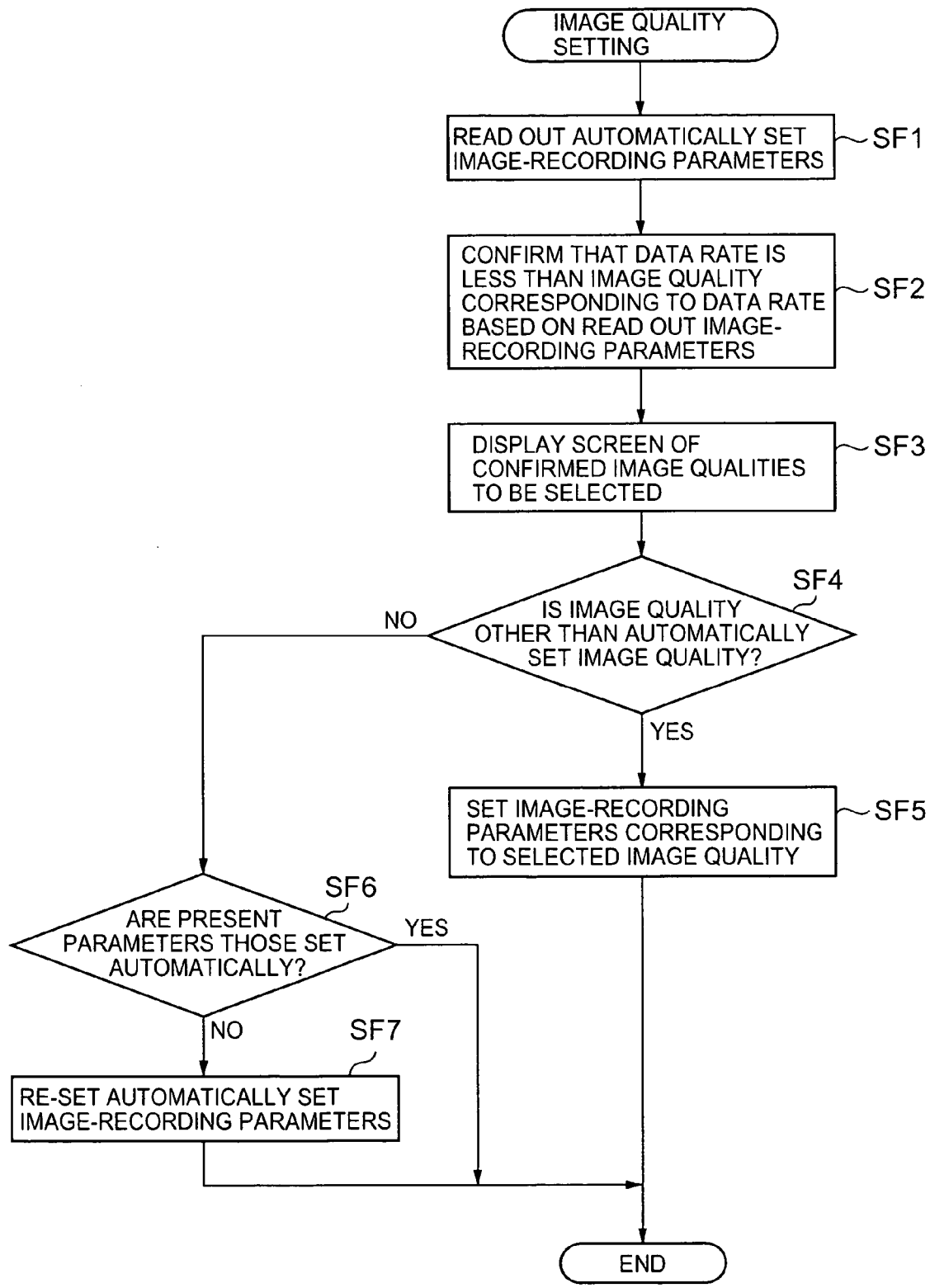
FIG. 13 is a flow chart of operation in an image quality setting mode in the forth embodiment.

Meanwhile, FIG. 13 is a flow chart showing processes executed by CPU 13 when an image quality setting mode is selected from among various setting modes by the user to set the recorded image quality in the moving image shooting operation, after the image-recording parameters are recorded on the program memory 19 in the operation in FIG. 12.

When the image quality setting mode is selected, CPU 13 reads out the automatically set image-recording parameters from the program memory 19 at step SF1 in FIG. 13. A recorded image quality, whose data rate in the image-recording operation is less than the data rate based on the set values of the image-recording parameters, is confirmed among the previously prepared image-recording qualities (Refer to FIG. 2) at step SF2. Then, at step SF3 on LCD 12 is displayed a certain recorded image quality selecting screen including only one or plural confirmed image-recording qualities as candidates to be selected, allowing the user to select his or her desired recorded image quality by a key operation. On the recorded image quality selecting screen are displayed an automatically set recorded image quality as well as the above mentioned one or plural confirmed recorded-image qualities as candidates to be selected.

When the user selects the recorded image quality other than the automatically set recorded image quality at step SF4, values of the image-recording parameters corresponding to the selected recorded-image quality are set to be used in the moving-image shooting operation at step SF5, and then the image quality setting mode is finished. When the automatically set recorded image quality is selected (NO at step SF4), and the automatically setting mode has been set (YES at step SF6), the image quality setting mode is finished. When the present values of the image-recording parameters are not those automatically set, that is, when the recorded image quality other than that automatically set is selected by the user (NO at step SF6), the set values of the image-recording parameters recorded on the program memory 1 are set to values of the image-recording parameters to be used in the moving-image shooting operation at step SF7 and then the image quality setting mode is finished.

In the embodiment described above, since the image-recording parameters, that is, the recorded image quality (image-recording parameters) is automatically set in accordance with the data-writing rate (feature) of the recording medium 20 at the time when the system starts up, the data rate in the image-recording operation is restricted to a level less than the data-writing rate of the recording medium 20. Therefore, even in case plural sorts of recording media each having a different data-writing rate cannot be installed, the normal moving-image recording operation is performed in the moving-image shooting operation without failure. Since the maximum data-writing rate at which data is written onto the recording medium is calculated, in which overhead is taken into consideration, the image-recording operation of a higher image quality can be performed using the data-writing feature of the recording medium 20.

When information concerning the maximum data-writing rate is obtained, measurement data previously recorded on a certain area of the recording medium 20 is used as data to be actually recorded on the recording medium 20, and such data is read out from the given area of the recording medium 20 and is written back onto the recording medium 20 to obtain the information concerning the maximum data-writing rate. Therefore, on the contrary to the usage of the moving image data recorded on the recording medium 20, there is no need to confirm whether or not available data is recorded on the recording medium and to confirm whether or not any area where the measurement data is to be written is left on the recording medium 20. When information concerning the maximum data-writing rate is obtained, measurement data may be written on the recording medium 20 without any troublesome procedure and the data-writing rate may be measured effectively. The image-recording parameters may be automatically set at all times regardless of whether there is recorded the moving image data on the recording medium 20.

Note that, though the description has been made on the case that the measurement data was read out from the given area of the recording medium 20 and written back onto the recording medium 20 without applying any process, it is enough for measuring the data-writing rate that the area where the measurement data is to be written is previously determined, and even though the measurement data is written onto an area other than the area from which such measurement data is read out, the data-writing rate may be effectively measured.

Any data which is recorded for the purpose other than calculating the maximum data-writing rate may be used as the above mentioned measurement data. Further, any data which is actually recorded on the built-in memory 14 or on the program memory 19 in the camera body may be used as the measurement data which is recorded on the recording medium 20 for measuring the maximum data-writing rate. In those cases, there is no need to secure a recording area in the recording medium 20 for recording the measurement data, and the recording medium 20 may be more effectively used.

In the present embodiment, when the user is allowed to select an recorded image quality in the image quality setting mode, only the image-recording qualities whose data rates in the image-recording operation are less than that based on the read out image-recording parameters are provided as candidates to be selected by the user from among the previously prepared image-recording qualities except the automatically set recorded image quality. Therefore, there is no opportunity for the user to select in error a high recorded image quality that cannot be secured with respect to the sort or features of the recording medium 20 which the user uses at the selection of the image quality. The present embodiment provides a user friendly apparatus.

In the present embodiment, the image-recording parameters are automatically set immediately after the system starts up, but such parameters may be set any time. For example, the parameters may be set at the time when the recording medium 20 is changed, or immediately after the recorded image quality setting mode or the moving image shooting mode has been selected.

In the third and forth embodiment described above, the maximum data-writing rate at which data is written on the recording medium 20 is measured by actually writing data on the recording medium 20, but the maximum data-writing rate may be measured in other manner. For example, the maximum writing rate of the recording medium 20 is previously measured (at manufacture of the medium) and the writing-rate data representing such maximum rate is recorded on the recording medium 20. An arrangement may be made in a digital camera, such that the writing-rate data is read out from the recording medium 20 to obtain the maximum data-writing rate in the camera. In this case, the image-recording parameters may be obtained any time depending on the features of the recording medium 20. Further, a process for obtaining the maximum writing rate may be made simple.

The writing-rate data previously recorded on the recording medium 20 is not necessary to be data that directly represents the maximum writing rate, but any data may be used that specifies the maximum writing rate. For example, card-sort data specifying the sort of the recording medium 20 may be used. In this case, an arrangement may be made such that a table is recorded which represents relationships between plural pieces of card-sort data and the maximum writing rates specified by the card-sort data, and that the maximum writing rate is obtained from the recorded table.

Further, when data is actually recorded on the recording medium 20 on which the writing rate data has been recorded, an arrangement may be made to compensate difference between the writing rate and the maximum writing rate represented by the above mentioned writing rate data, which difference may be caused by difference in configurations of the digital cameras. That is, in the arrangement, unique compensation data is previously recorded in the digital data (in the program memory 19 and the like), and the maximum writing rate is obtained from the compensation data and the above mentioned writing rate. In this case, since the more precise maximum writing rate can be obtained, the image-recording operation of a high image quality can be performed by using the full features of the recording medium 20.

In the third and fourth embodiment of the invention, concerning the recorded image quality which the user is allowed to select in the moving image shooting operation, it has been described that the user can select any one of "fine", "normal", and "economy", for which regulated values of the image-recording parameters are prepared. The present invention may be applied to any apparatus, in which the user can set the recorded image quality by separately setting values of some of or all of the image-recording parameters. In this case, the same advantage may be enjoyed.

Further, when the image-recording parameters are adjusted in the image-recording operation in the third embodiment of the invention, or at the time the system starts up in the fourth embodiment, an arrangement may be made such that CPU 13 is made to serve as information obtaining means of the present invention to obtain information on remaining capacity of the recording medium 20 for recording data and/or a battery level of the power source battery of the camera body, and that the image-recording parameters are determined taking the remaining capacity of the recording medium 20 and the battery level into consideration. In this case, since the values of the image-recording parameters can be determined in precise based on the remaining capacity of the recording medium 20 and the battery level, controllability of the recorded image quality may be enhanced.

In the digital camera, in which plural photographing modes corresponding to predetermined scenes (for example, sport and night scenes) are prepared, and CPU 13 serves as photographing mode selecting means, and the user is allowed to select his or her desired mode, modification may be made such that, for example, when the sport mode has been selected as the photographing mode, only certain image-recording parameters corresponding to the photographing mode selected by the user, such as the compression rate and the image size other than the frame rate are adjusted. Further, modification can be made such that when plural adjustable parameters or plural parameters to be adjusted are prepared, the priority order of adjustment for each of the image-recording parameters is determined.

Further, in the third and fourth embodiment, it has been explained that the present invention can be applied to the digital camera having the moving image shooting function, but the invention is not limited to the above, and can be applied to any apparatus which has a stream recording function of a moving image, for example, such as an electronic camera apparatus employed in a digital video camera, a cellular phone with a camera, and PDA with a camera. The same advantages described above will be obtained.

What is claimed is:

1. A moving-image recording apparatus comprising:
  an obtaining unit for continuously obtaining, at a certain frame period, plural pieces of image data composing a moving image;
  a recording unit for successively writing onto a recording medium, at the certain frame period, the plural pieces of image data continuously obtained by the obtaining unit;
  a judging unit for judging, every frame period, whether or not any delay occurs in a data writing process by the recording unit, while the recoding unit writes the image data onto the recording medium at the certain frame period;
  a stopping unit for making the recording unit not write onto the recording medium the piece of image data obtained by the obtaining unit for a frame period in which the judging unit determines that a delay has occurred; and
  an adjusting unit for writing on the recording medium certain information for reproducing image data in place of the piece of image data that the stopping unit has made the recording unit not write, said certain information having a data amount that is less than a data amount of the piece of image data;
  wherein the judging unit determines that the delay has occurred in the data writing process when image data remains to be written onto the recording medium at a time for the recording unit to write a next piece of image data, and the adjusting unit writes said certain information on the recording medium after the recording unit has written the image data that remains to be written; and
  wherein the adjusting unit counts a number of frame periods for which the stopping unit has made the recording unit not write the pieces of image data while the judging unit determines that the delay has occurred in the data writing process, and the adjusting unit writes on the recording medium, in one lump, said certain information for reproducing the image data for the counted number of frame periods after the recording unit has written the image data that remains to be written.

2. The moving-image recording apparatus according to claim 1, wherein each of the pieces of image data to be written on the recording medium by the recording unit has index information which represents an order of reproduction of the image data, and the adjusting unit records the certain information as the index information on the recording medium.

3. The moving-image recording apparatus according to claim 1, further comprising:
  a buffer for temporarily storing image data for plural frames to be written on the recording medium by the recording unit,
  wherein the judging unit determines that the delay has occurred, when an empty size left in the buffer is less than a predetermined size at a time when new image data is to be written on the buffer.

4. The moving-image recording apparatus according to claim 1, further comprising a notifying unit for notifying that an intended recorded image quality cannot be secured, when the judging unit determines that the delay has occurred.

5. The moving-image recording apparatus according to claim 1, wherein when the judging unit determines that a delay has occurred for plural frame periods, the stopping unit makes the recording unit not write on the recording medium the pieces of image data for the plural frame periods, and the adjusting unit writes on the recording medium the certain information for reproducing image data for the plural frame periods in place of the pieces of image data for the plural frame periods, said certain information having a data amount that is less than a data amount of the pieces of image data for the plural frame periods.

6. A moving image recording method comprising:
an obtaining process comprising continuously obtaining, at a certain frame period, plural pieces of image data composing a moving image;
a recording process comprising successively writing onto a recording medium, at the certain frame period, the plural pieces of image data continuously obtained in the obtaining process;
a judging process comprising judging, every frame period, whether or not any delay occurs in the recording process, while the recording process is writing the image data onto the recording medium at the certain frame period;
a stopping process comprising making the recording process not write onto the recording medium the piece of image data obtained by the obtaining process for a frame period in which the judging process determines that a delay has occurred; and
an adjusting process comprising writing on the recording medium certain information for reproducing image data in place of the piece of image data that the stopping unit has made the recording unit not write, said certain information having a data amount that is less than a data amount of the piece of image data;
wherein the judging comprises determining that the delay has occurred in the recording process when image data remains to be written onto the recording medium at a time for writing a next piece of image data, and the adjusting process comprises writing said certain information on the recording medium after the recording process has written the image data that remains to be written; and
wherein the adjusting process comprises counting a number of frame periods for which the stopping process has made the recording process not write the pieces of image data while the judging process determines that the delay has occurred in the recording process, and the adjusting process comprises writing on the recording medium, in one lump, said certain information for reproducing the image data for the counted number of frame periods after the recording process has written the image data that remains to be written.

7. A computer readable recording medium having a program stored thereon that is executable by a computer of a moving-image recording apparatus to control the moving-image recording apparatus to perform a process comprising:
an obtaining process comprising continuously obtaining, at a certain frame period, plural pieces of image data composing a moving image;
a recording process comprising successively writing onto a recording medium, at the certain frame period, the plural pieces of image data continuously obtained in the obtaining process;
a judging process comprising judging, every frame period, whether or not any delay occurs in the recording process, while the recording process is writing the image data onto the recording medium at the certain frame period;
a stopping process comprising making the recording process not write onto the recording medium the piece of image data obtained by the obtaining process for a frame period in which the judging process determines that a delay has occurred; and
an adjusting process comprising writing on the recording medium certain information for reproducing image data in place of the piece of image data that the stopping unit has made the recording unit not write, said certain information having a data amount that is less than a data amount of the piece of image data;
wherein the judging comprises determining that the delay has occurred in the recording process when image data remains to be written onto the recording medium at a time for writing a next piece of image data, and the adjusting process comprises writing said certain information on the recording medium after the recording process has written the image data that remains to be written; and
wherein the adjusting process comprises counting a number of frame periods for which the stopping process has made the recording process not write the pieces of image data while the judging process determines that the delay has occurred in the recording process, and the adjusting process comprises writing on the recording medium, in one lump, said certain information for reproducing the image data for the counted number of frame periods after the recording process has written the image data that remains to be written.

* * * * *